United States Patent
Belt et al.

(10) Patent No.: US 6,949,488 B2
(45) Date of Patent: Sep. 27, 2005

(54) FISCHER-TROPSCH CATALYST REGENERATION

(75) Inventors: Barbara A. Belt, Seabrook, TX (US); Stephen R. Landis, Katy, TX (US); Sergio R. Mohedas, Ponca City, OK (US); Ajoy P. Raje, Stillwater, OK (US)

(73) Assignee: ConocoPhillips Company, Houston, TX (US)

(*) Notice: Subject to any disclaimer, the term of this patent is extended or adjusted under 35 U.S.C. 154(b) by 140 days.

(21) Appl. No.: 10/251,928

(22) Filed: Sep. 20, 2002

(65) Prior Publication Data

US 2004/0059009 A1 Mar. 25, 2004

(51) Int. Cl.⁷ .......................... B01J 20/34; B01J 38/10; B01J 38/02
(52) U.S. Cl. .............. 502/56; 502/20; 502/53
(58) Field of Search .............. 502/20, 53, 56

(56) References Cited

U.S. PATENT DOCUMENTS

| | | | | |
|---|---|---|---|---|
| 4,626,552 A | * | 12/1986 | Arcuri | 518/712 |
| 5,300,277 A | * | 4/1994 | Kresge et al. | 423/703 |
| 6,022,755 A | | 2/2000 | Kinnari et al. | |
| 6,043,288 A | | 3/2000 | DeGeorge et al. | |
| 6,147,126 A | * | 11/2000 | DeGeorge et al. | 518/715 |
| 6,486,220 B1 | * | 11/2002 | Wright | 518/709 |
| 6,753,351 B2 | * | 6/2004 | Clark et al. | 518/700 |

* cited by examiner

Primary Examiner—Stanley S. Silverman
Assistant Examiner—Jonas N. Strickland
(74) Attorney, Agent, or Firm—Conley Rose P.C.

(57) ABSTRACT

Methods and apparatus for providing the heat required to maintain the desired temperature for catalyst regeneration. The catalyst is heated by contacting a reactant gas mixture with the catalyst in order to initiate an exothermic reaction and, once the desired temperature is achieved, exposing the catalyst to a regenerating gas. The temperature may also be maintained by heating the reactant gas mixture prior to contacting the catalyst and/or adding a liquid, which may be heated, to the catalyst. For heating a Fischer-Tropsch catalyst for regeneration, the reactant gas preferably contains less than 12 mole percent carbon monoxide and more preferably contains between 1 and 4 mole percent carbon monoxide.

19 Claims, 2 Drawing Sheets

FISCHER-TROPSCH CATALYST REGENERATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates generally to methods and apparatus for achieving and maintaining a desired temperature to support the regeneration of a catalyst. More specifically, the present invention relates to methods and apparatus for utilizing the heat generated by an exothermic reaction, such as the Fischer-Tropsch reaction, to achieve and maintain the desired temperature for the regeneration of a Fischer-Tropsch catalyst.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of an amount of gas is so much greater than the volume of the same number of gas molecules in a liquefied state, the process of transporting natural gas typically includes chilling and/or pressurizing the natural gas in order to liquefy it. However, this contributes to the final cost of the natural gas and is not economical.

Formations that include small amounts of natural gas may include primarily oil, with the natural gas being a byproduct of oil production that is thus termed associated gas. In the past, associated gas has typically been flared, i.e., burned in the ambient air. However, current environmental concerns and regulations discourage or prohibit this practice.

Further, naturally occurring sources of crude oil used for liquid fuels such as gasoline, jet fuel, kerosene, and diesel fuel have been decreasing and supplies are not expected to meet demand in the coming years. Fuels that are liquid under standard atmospheric conditions have the advantage that in addition to their value, they can be transported more easily in a pipeline than natural gas, since they do not require liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is reacted with hydrogen to form organic molecules containing carbon and hydrogen. Those molecules containing only carbon and hydrogen are known as hydrocarbons. Those molecules containing oxygen in addition to carbon and hydrogen are known as oxygenates. Hydrocarbons having carbons linked in a straight chain are known as aliphatics and are particularly desirable as the basis of synthetic diesel fuel.

The Fischer-Tropsch process is commonly facilitated by a catalyst. Catalysts desirably have the function of increasing the rate of a reaction without being consumed by the reaction. Common catalysts for use in the Fischer-Tropsch process contain at least one metal from Groups 8, 9, or 10 of the Periodic Table (in the new IUPAC notation, which is used throughout the present specification). The molecules react to form hydrocarbons while confined on the surface of the catalyst. The hydrocarbon products then desorb from the catalyst and can be collected. H. Schulz (Applied Catalysis A: General 1999, 186, p 3) gives an overview of trends in Fischer-Tropsch catalysis.

The catalyst may be contacted with synthesis gas in a variety of reaction zones that may include one or more reactors. Common reactors include packed bed (also termed fixed bed) reactors, slurry bed reactors, and fluidized bed reactors. Originally, the Fischer-Tropsch synthesis was carried out in packed bed reactors. These reactors have several drawbacks, such as poor temperature control, that can be overcome by gas-agitated slurry reactors or slurry bubble column reactors. Gas-agitated multiphase reactors sometimes called "slurry reactors" or "slurry bubble columns," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Gas-agitated multiphase reactors or slurry bubble column reactors (SBCRs) inherently have very high heat transfer rates; therefore, reduced reactor cost and the ability to remove and add catalyst online are principal advantages of such reactors in Fischer-Tropsch synthesis, which is exothermic. Sie and Krishna (Applied Catalysis A: General 1999, 186, p. 55) give a history of the development of various Fischer Tropsch reactors.

Typically the Fischer-Tropsch product stream contains hydrocarbons having a range of numbers of carbon atoms, and thus having a range of molecular weights. Thus, the Fischer-Tropsch products produced by conversion of synthesis gas commonly contains a range of hydrocarbons including gases, liquids and waxes. It is highly desirable to maximize the production of high-value liquid hydrocarbons, such as hydrocarbons with at least 5 carbon atoms per hydrocarbon chain ($C_5$+hydrocarbons).

The composition of a catalyst influences the relative amounts of hydrocarbons obtained from a Fischer-Tropsch catalytic process. Cobalt metal is particularly desirable in catalysts used in converting natural gas to hydrocarbons suitable for the production of diesel fuel. Further, iron, nickel, and ruthenium have been used in Fischer-Tropsch catalysts. Nickel catalysts favor termination and are useful for aiding the selective production of methane from syngas. Iron has the advantage of being readily available and relatively inexpensive but the disadvantage of a water-gas shift activity. Ruthenium has the advantage of high activity but is quite expensive.

One of the limitations of a Fischer-Tropsch process is that the activity of the catalyst will, due to a number of factors, deteriorate over time. The catalyst can be regenerated by exposure to a stream of hydrogen or some other gas. One preferred technique for the regeneration of catalyst takes place at temperature that is well above the temperature maintained within the reactor. Therefore, it is necessary to provide a source for increasing the temperature of the catalyst for regeneration and maintaining that temperature during the regeneration process. Maintaining the catalyst at the desired temperature during regeneration is further complicated by the regeneration process being slightly endothermic, thereby acting to decrease the temperature of the catalyst during regeneration.

Several methods are presently used to supply the heat needed to achieve and maintain the temperature of the catalyst during the regeneration process. These methods generally include disposing a heat source within, or outside of, a vessel containing the catalyst. This heat source may be an electric resistance heater or a heating coil circulating a high temperature fluid, such as steam. Both of these methods may potentially be very expensive to install and maintain. For example, high pressure steam used for heating is typically circulated through steam coils that must be constructed from high strength materials, which are normally expensive, and electrical resistance based heating often results in very high operational costs. These types of devices may also create a barrier to the free flow of material because the heat source is disposed directly in the vessel.

Thus, there remains a need in the art for methods and apparatus to improve the efficiency of achieving and maintaining the temperature for a catalyst regeneration process. Therefore, the embodiments of the present invention are directed to methods and apparatus for constructing and operating a regeneration system that seek to overcome these and other limitations of the prior art.

SUMMARY OF THE PREFERRED EMBODIMENTS

Accordingly, there are provided herein methods and apparatus for achieving and maintaining a desired temperature for catalyst regeneration. The preferred embodiments of the present invention are characterized by a system that utilizes the heat of an exothermic reaction to achieve and maintain the temperature desired for catalyst regeneration. In one embodiment, the heat provided to the catalyst regeneration system may be generated by the Fischer-Tropsch reaction by co-feeding a small amount of carbon monoxide along with a hydrogen rich stream. The amount of heat input to the system can be further controlled by adjusting the temperature of the reactant gases, and/or by adding a hydrocarbon liquid, at a selected temperature, to the regeneration vessel.

One embodiment includes contacting a reactant gas mixture with a catalyst, in order to initiate an exothermic reaction that will increase the temperature of the catalyst, and exposing the catalyst to a regenerating gas. The desired temperature may be maintained by heating the reactant or regenerating gas mixtures prior to contacting the catalyst, adding a temperature controlled liquid to the catalyst, and/or keeping a small amount of carbon monoxide, or other reactant gas mixture, in the regenerating gas feed stream. In most instances, the temperature increase in the catalyst will be associated with a temperature increase in the system.

One embodiment of a system for regenerating a catalyst includes a regenerating vessel, a regenerating gas source, and a reactant gas source. One preferred system has a regenerating gas recycle loop that includes a recovery system to recover reaction products from the gas leaving the regenerating vessel, a purification system for removing unwanted contaminants from the gas, a heater for heating the gas, and a bypass loop for bypassing the heater. The system may also include a liquid hydrocarbon source as well as a heater for the liquid hydrocarbon, and a bypass loop for bypassing the heater.

Specific embodiments may be methods of heating a Fischer-Tropsch catalyst for regeneration by contacting a reactant gas containing carbon monoxide and hydrogen with the catalyst to initiate a Fischer-Tropsch reaction and exposing the catalyst to a regenerating gas. The reactant gas preferably contains less than 12 mole percent carbon monoxide and more preferably contains between 1 and 4 mole percent carbon monoxide.

The heat required to achieve and maintain the regeneration temperature is preferably provided by a Fischer-Tropsch reaction, but may also be at least partially supplied by heating the reactant or regenerating gas prior to contacting the catalyst. The catalyst may be suspended in a slurry and liquid hydrocarbons can be added to the slurry to maintain temperature and liquidity of the slurry. The liquid hydrocarbons may also be heated before adding to the slurry.

The embodiments of the present invention may be used in a batch, semi-batch, or continuous regeneration process that includes moving the slurry from a reactor vessel to a regenerating vessel, regenerating the catalyst, and moving the catalyst to the reactor vessel from the regenerating vessel. The catalyst may also be regenerated within the reactor vessel by cycling between a reaction mode and a regeneration mode.

Thus, the present invention comprises a combination of features and advantages that enable it to provide several efficient alternatives in supplying the heat required to maintain the desired temperature for catalyst regeneration. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
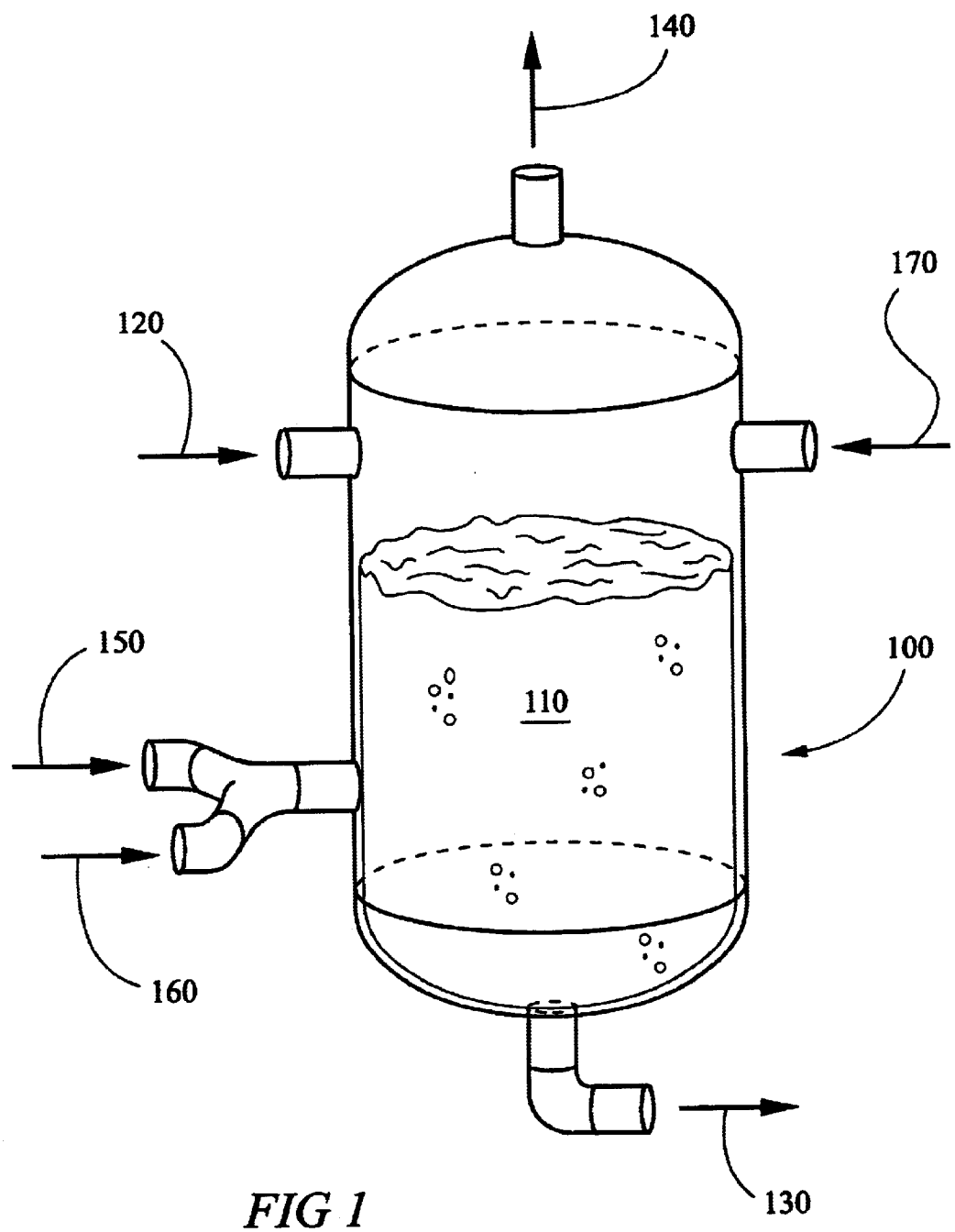
FIG. 1 is a schematic representation of a simple catalyst regeneration system.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for supplying heat to support the regeneration of a catalyst. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. For example, the temperatures and pressures described herein are merely representative temperatures and pressures of one particular Fischer-Tropsch process and, except where expressly claimed, are not intended to limit the possible temperatures and pressures at which the embodiments of the present invention may find utility.

In particular, various embodiments of the present invention provide a number of different methods and apparatus for supplying heat for regenerating a catalyst. Reference is made to a Fischer-Tropsch catalyst and reaction, but the use of the concepts of the present invention is not limited to the Fischer-Tropsch reaction and can be used with any other catalyst system that supports an exothermic reaction and requires periodic catalyst regeneration. It is to be fully recognized that the different teachings of the embodiments discussed below may be employed separately or in any suitable combination to produce desired results.

FIG. 1 shows a regeneration vessel 100 containing a catalyst and wax slurry 110. Vessel 100 includes slurry inlet 120, slurry outlet 130, gas outlet 140, hydrogen supply 150, carbon monoxide supply 160, and a liquid hydrocarbon supply 170. For purposes of discussion, regeneration vessel 100 will be described as a vessel separate from the Fischer-Tropsch reactor for the batch, semi-batch, or continuous regeneration of catalyst, but vessel 100 may also be the Fischer-Tropsch reactor where the regeneration takes place in the reactor vessel.

Slurry 110 is pumped, either mechanically or by a pressure differential, into vessel 100 at a temperature lower than that desired for the regeneration process. A regenerating gas containing hydrogen ($H_2$) is fed into slurry 110 from hydrogen supply 150 while a reactant gas containing carbon monoxide (CO) is pumped from CO supply 160. FIG. 1 shows supplies 150 and 160 being mixed before entering vessel 100, but it is also understood that supplies 150 and 160 may enter vessel 100 as separate streams.

The CO is preferably supplied by syngas but may also be from some other convenient source of CO, such as tail gas from the Fischer-Tropsch reactor, which is the uncondensed portion of the reactor off gas. The $H_2$ is preferably a pure hydrogen gas but may also be a hydrogen-rich gas from any source. Other gases may also prove suitable for supporting catalyst regeneration as long as some carbon monoxide is supplied to support the Fischer-Tropsch reaction and hydrogen is supplied to support the regeneration reactions.

In the presence of the catalyst, the Fischer-Tropsch reaction will occur and, because the reaction is exothermic, the temperature of the slurry will increase. The CO and $H_2$ are injected into the slurry in such proportions so that substantially all of the CO is reacted while most of the $H_2$ is available for regenerating the catalyst. The amount of CO injected into slurry 110 is closely controlled so that there is a sufficient reaction taking place to provide the required heat but not enough to counteract the regeneration process due to water generated during the Fischer-Tropsch reactions. The amount of CO contained in the reactant gas mixture will depend on the amount of heat required by the regeneration system and the catalyst system used. The content of CO, will at least be less than 50% by mole, but will preferably be less than 12% CO by mole in the final mixture of the CO source stream and the $H_2$ rich stream.

Once vessel 100 has reached the desired operating temperature, the flow of CO can be decreased or completely stopped, providing only a stream of $H_2$ to vessel 100. The $H_2$ gas will regenerate the catalyst but the regeneration reaction will tend to reduce the temperature of slurry 110. Any additional heat required to maintain the temperature of slurry 110 can be provided by adding a small amount of CO, preheating the CO or $H_2$ outside of the reactor, or adding a liquid hydrocarbon from supply 170. A liquid hydrocarbon stream may also be added to replace other hydrocarbons, which may tend to gasify during regeneration, in order to maintain the level and liquidity of the slurry. At least a portion of this liquid hydrocarbon stream has a boiling point such that the 5% point of the true boiling point (TBP) curve is higher than the operating temperature in the regeneration vessel at operating pressure. Once the regeneration process is compete, slurry 110 can be returned to a reactor. Because the reactor is likely at a lower temperature than the regenerated slurry, the slurry may have to be cooled before entering the reactor.

Figure 2:
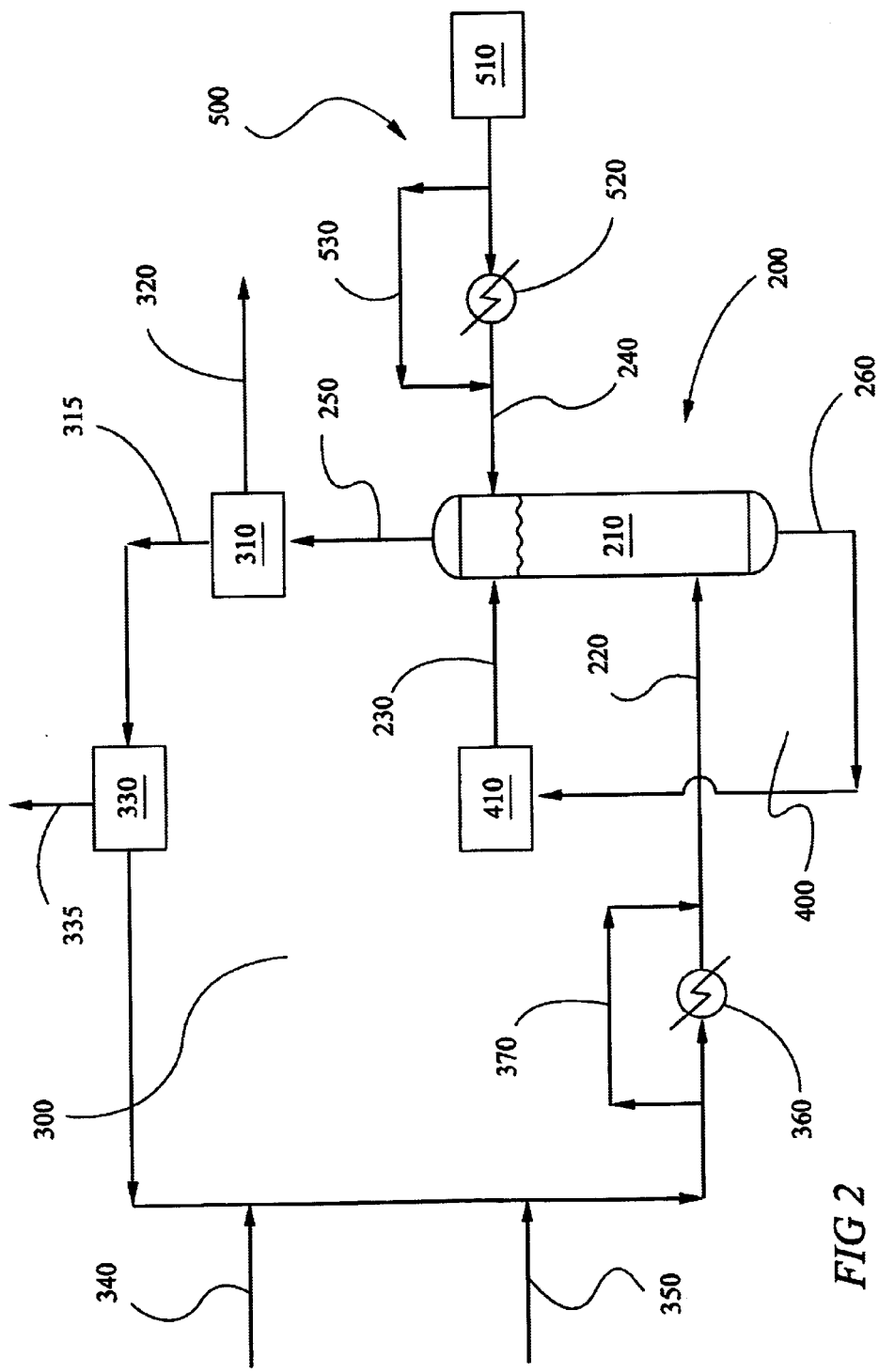
FIG. 2 is a schematic representation of a preferred catalyst regeneration system.

Referring now to FIG. 2, one embodiment of a catalyst regeneration system 200 is shown. System 200 includes regeneration vessel 210, gas loop 300, slurry loop 400, and hydrocarbon supply 500. Vessel 210 has a gas inlet 220, slurry inlet 230, liquid inlet 240, gas outlet 250, and slurry outlet 260. Gas loop 300 includes hydrocarbon recovery unit 310, light hydrocarbon export stream 320, hydrogen purification system 330, with purge 335, hydrogen supply 340, carbon monoxide supply 350, heater 360, and bypass loop 370. Slurry loop 400 includes a reactor system 410 containing a catalyst slurry. Hydrocarbon supply 500 includes a hydrocarbon inlet source 510, heater 520, and bypass loop 530.

Gas outlet 250 removes a gas containing light hydrocarbons, water, hydrogen, and other gases from vessel 210 and feeds hydrocarbon recovery unit 310, which separates the gas to produce a stream of hydrocarbons 320 and a hydrogen rich stream 315. Recovery unit 310 may also produce a stream of water. Hydrogen rich stream 315 feeds hydrogen purification system 330 that removes other unwanted gases from the stream. Purge 335 may be provided to allow unwanted quantities of gases and/or liquid to be removed from the system. The purified hydrogen stream from purification system 330 can be supplemented by hydrogen source 340 and is combined with gas from carbon monoxide source 350 to form a feed gas to vessel 210 that preferably has between 1 and 12 mole percent carbon monoxide. The mixture of $H_2$ and CO can be flowed through heater 360, bypass loop 370, or both, in order to control the temperature of the gas mixture. The gas mixture then flows vessel 210 through gas inlet 220.

A preferably gas mixture contains 4 mole percent carbon monoxide. Hydrogen source 340 is preferably a source of pure hydrogen, but may be any hydrogen containing stream. Carbon monoxide source 350 is preferably syngas but may also be any carbon monoxide containing source. In determining $H_2$ and CO sources, care should be taken not to introduce other gases which may be harmful to the catalyst system.

Slurry 110 is drawn out of reactor system 410 and into vessel 210 through slurry inlet 230. The catalyst contained in the slurry is regenerated in vessel 210 and then released back into reactor system 410 through outlet 260.

Hydrocarbon supply 500 includes heater 520 and bypass loop 530 that enable the temperature of product from hydrocarbon supply 510 to be controlled prior to entering vessel 210 through hydrocarbon inlet 240.

At one preferred set of operating conditions, regeneration of the catalyst takes place in vessel 210 at 550–600° F. Slurry enters vessel 210 from reactor system 410 at a temperature of 400–450° F. A gas mixture containing 4 mole percent CO at 450–600° F. is bubbled into vessel 210 at a rate such as to maintain the solid catalyst particles suspended in the three phase mixture. This rate corresponds to at least the inlet rate required to maintain the minimum fluidization velocity, which depends on the regeneration operating conditions, vessel size, solid and liquid physical properties, etc.

The amount of CO in the final combined feed to the regenerator is such as to produce a controlled amount of heat sufficient to increase the regenerator vessel temperature up to a desired temperature and/or to maintain the regenerator vessel content at the desired temperature depending upon the step of the regeneration procedure being carried out. Once the temperature of the slurry reaches the desired regeneration temperature, the mole percent of CO is reduced during the regeneration process. The inlet temperature of the gas mixture can be varied to control the temperature in the regeneration vessel. A stream of heavy liquid hydrocarbons, preferably preheated to 300–550° F. may also be added to vessel 210 at the rate sufficient to replace lighter hydrocarbons that may vaporize. Once the regeneration process is complete, the slurry is returned to reactor system 410.

The compositions, flow rate, and temperature of the gas mixture and the hydrocarbon stream will depend on the size of vessel 410 as well as the specific parameters of the catalyst regeneration process employed. For varying catalyst regeneration processes, the temperature inside vessel 410 may be maintained by varying the CO content in the gas mixture, preheating the gas mixture, preheating the heavy hydrocarbon stream, passing a heat transfer fluid through cooling coils that may be included in vessel 410, or any combination thereof. Thus, the embodiments of the present invention enable the operator of a catalyst regeneration process several options for controlling the temperature within the regeneration vessel.

Although described as being used for catalyst regeneration in a separate vessel, the above described embodiments could be adapted for use in regenerating catalyst within the slurry reactor, obviating the need to move the slurry for regeneration. Alternate embodiments may also be used to regenerate catalysts contained in fixed bed, ebullated bed, or any other type catalyst suspension system.

The above described embodiments may also be used in initially reducing the catalyst. The reduction of metal oxides into active Fischer-Tropsch metals in a slurry environment is subject to hydrogenolysis. Hydrogenolysis breaks down the slurry into lighter fragments, including methane, and leads to a decrease in the slurry level and a resulting loss of viscosity. Carbon monoxide acts as a poison to the hydrogenolysis process. Therefore, the addition of carbon monoxide during catalyst reduction will greatly reduce the rate of hydrogenolysis and the resulting loss of slurry during reduction.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A method of heating a catalyst for regeneration comprising;
    contacting a reactant gas mixture with the catalyst to initiate an exothermic reaction so as to heat the catalyst, wherein the reactant gas comprises carbon monoxide and hydrogen and contains less than 12 mole percent of carbon monoxide; and
    exposing the catalyst to a regenerating gas while the catalyst is heated by the exothermic reaction.

2. The method of claim 1 further comprising heating the reactant gas mixture prior to contacting the catalyst.

3. The method of claim 1 further comprising adding a liquid to the catalyst.

4. The method of claim 3, wherein at least a portion of the added liquid is a liquid hydrocarbon stream having a boiling point at operating pressure such that the 5% point of the true boiling point (TBP) curve of the added liquid is higher than the temperature at which the catalyst is exposed to the regenerating gas.

5. The method of claim 3 further comprising heating the liquid before adding to the catalyst.

6. The method of claim 1 wherein the regenerating gas comprises a portion of the reactant gas.

7. A method of heating a Fischer-Tropsch catalyst for regeneration comprising;
    contacting a reactant gas containing carbon monoxide and hydrogen with the catalyst to initiate a Fischer-Tropsch reaction and heat the catalyst, wherein the reactant gas contains less than 12 mole percent carbon monoxide; and
    exposing the catalyst to a regenerating gas while the catalyst is heated by the Fischer-Tropsch reaction.

8. The method of claim 7 further comprising heating the reactant gas prior to contacting the catalyst.

9. The method of claim 7 further comprising adding liquid hydrocarbons to the catalyst.

10. The method of claim 9 further comprising heating the liquid hydrocarbons before adding to the catalyst.

11. The method of claim 9, wherein at least a portion of the added liquid hydrocarbons have a boiling point at operating pressure such that the 5% point of the true boiling point (TBP) curve of the added liquid is higher than the temperature at which the catalyst is exposed to the regenerating gas.

12. The method of claim 7 wherein the reactant gas contains hydrogen.

13. The method of claim 7 wherein the reactant gas contains between 1 and 4 mole percent carbon monoxide.

14. The method of claim 7 wherein the catalyst is suspended in a slurry.

15. The method of claim 14 further comprising:
    moving the slurry from a reactor vessel to a regenerating vessel;
    regenerating the catalyst; and
    moving the catalyst to the reactor vessel from the regenerating vessel.

16. The method of claim 15 wherein the slurry from the reactor vessel is at a temperature between 400° F. and 500° F.

17. The method of claim 15 wherein regenerating the catalyst takes place in the regenerating vessel at a temperature between 550° F. and 600° F.

18. The method of claim 7 wherein the catalyst is regenerated within a reactor vessel.

19. The method of claim 18 wherein the catalyst is regenerated within said reactor vessel by cycling between reaction mode and a regeneration mode.

* * * * *